(No Model.) 2 Sheets—Sheet 2.
J. H. JONES.
CIRCULAR SAWING MACHINE.
No. 296,334. Patented Apr. 8, 1884.
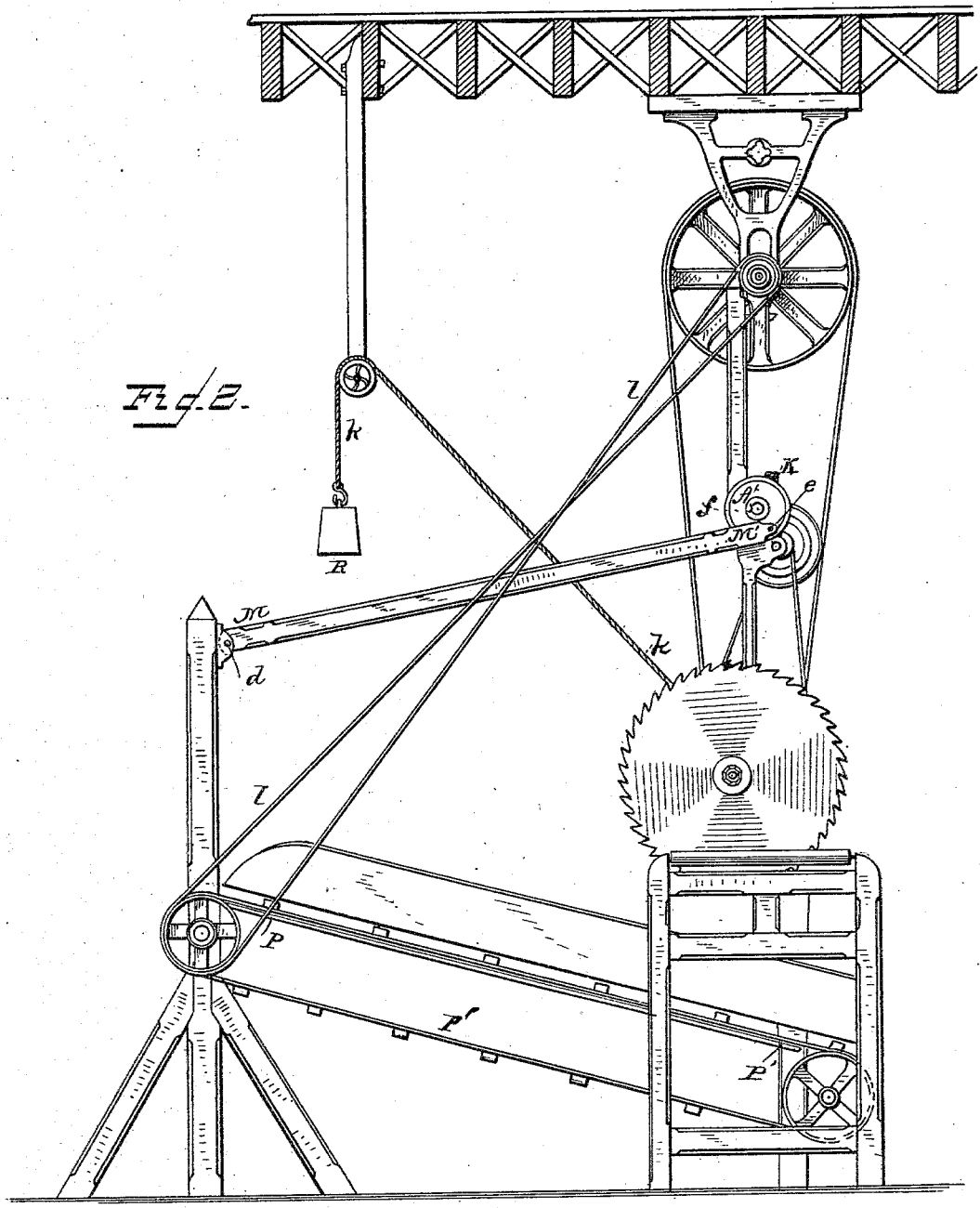
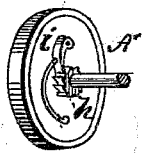
WITNESSES
Franck L. Ourand
Chas. H. Ourand
INVENTOR
Joel H. Jones
Edward S. Brown
his Attorney

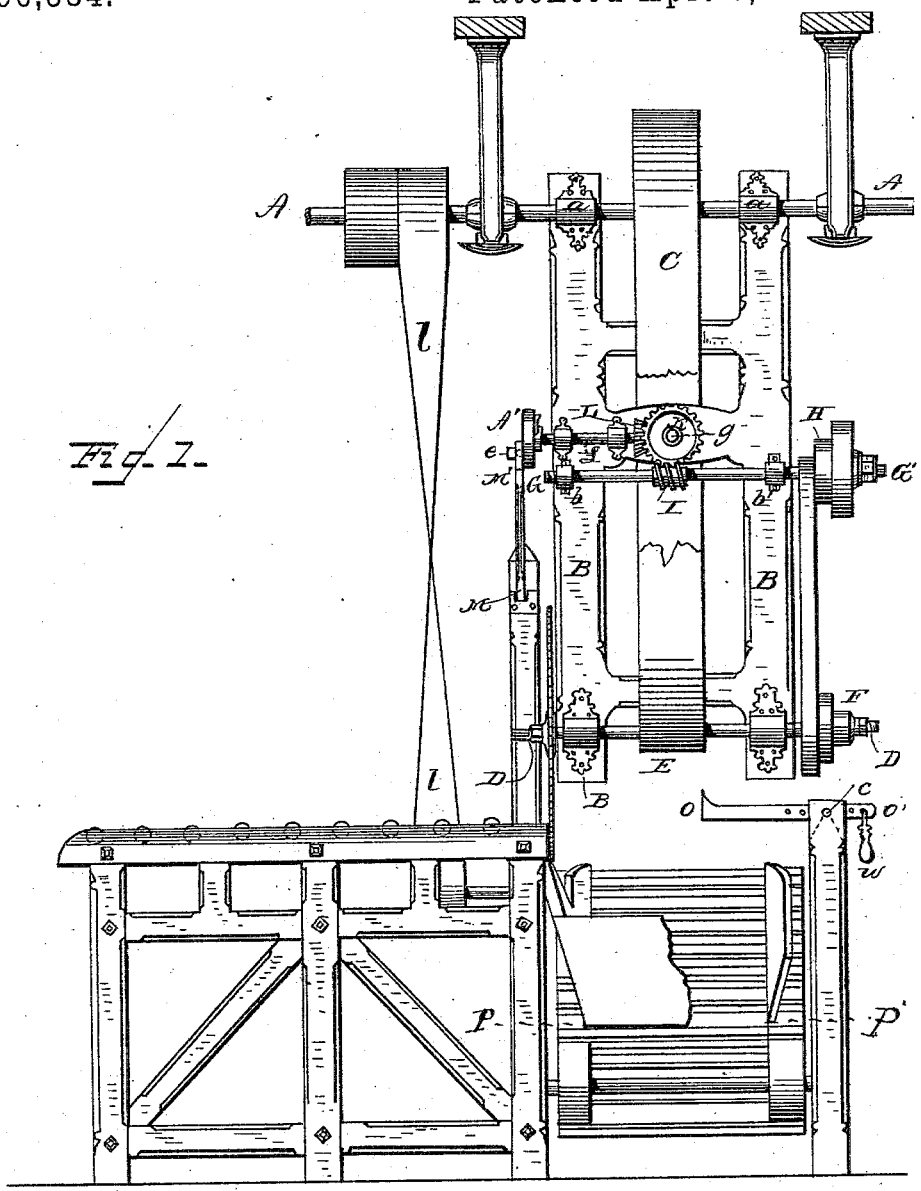

UNITED STATES PATENT OFFICE.

JOEL H. JONES, OF LYNCHBURG, VIRGINIA.

CIRCULAR SAWING MACHINE.

SPECIFICATION forming part of Letters Patent No. 296,334, dated April 8, 1884.

Application filed November 26, 1883. (No model.)

*To all whom it may concern:*

Be it known that I, JOEL H. JONES, of Lynchburg, in the county of Campbell and State of Virginia, have invented certain new and useful improvements in sawing-machines for sawing off wood, plank, and timber of various kinds, and for butting staves; and I do hereby declare that the following is a full and exact description thereof, reference being had to the accompanying drawings, making part of this specification.

My invention consists in a peculiar mechanism for feeding the saw to the work, substantially as hereinafter specified, whereby the rate of feed is made readily adjustable and adapted to the stuff to be sawed, and the speed of the saw constantly governs the rate of the feed, the feed ceases when the motion of the saw ceases, and begins when the saw begins its motion, so that there is always perfect accord between the sawing and the feed; also, in combination with the feed mechanism, of a device, substantially as hereinafter specified, for automatically and instantly swinging back the saw-frame, ready to begin to feed forward again as soon as a forward feed movement is completed, thereby saving time and power and avoiding the necessity of personal attention thereto.

It further consists in an automatically tilting and again righting gage, in combination with the saw, whereby the pieces sawed off are allowed to freely drop out of the way without any liability to bind against the saw, and thereby to cause damage and loss of power.

In the accompanying drawings, Figure 1 is a front view of the machine provided with my improvements; Fig. 2, a side view of the same, and Fig. 3 a detail view of a ratchet crank-disk employed in the feed mechanism.

Like letters designate corresponding parts in all of the figures.

In the drawings, A represents the driving-shaft of the machine, mounted on a suitable frame, and upon this shaft is hung and pivoted, by suitable bearings, $a\,a$, the frame B, which carries the saw, so that the frame may have an oscillating movement upon the said driving-shaft. The motion is transmitted from the driving-shaft by a belt passing from a pulley, C, on the said shaft to a pulley, E, on the saw-arbor D. Thus the saw-frame may have a swinging or oscillating movement without interfering with the driving of the saw from the stationary driving-shaft. The saw-frame is thus made to oscillate, so that the saw may be fed to the material instead of feeding the material to the saw, as the latter method of feeding cannot be accomplished so quickly nor with so little expenditure of power as the former. I claim no novelty in such a swinging saw-frame for this purpose; but my improvements for automatically producing and regulating the forward feed movement of the saw-frame, and the return movement thereof, are constructed and applied to the saw-frame substantially as follows: For producing the forward feed movement I make use of a vibratory pitman or bar, M, pivoted by one end, as at $d$, to a stationary post or equivalent unyielding holder, and the movable end M' of the pitman is pivoted to a crank-pin, $e$, on a revolving crank wheel or disk, A', the shaft $f$ of which is mounted in suitable bearings on the saw-frame. It is obvious that a slow revolution of this crank-disk, with its crank-pin turning in the end of the fixed vibratory pitman M, causes an oscillation of the saw-frame, the extent of the oscillation being determined by the distance of the crank-pin from the center of the crank-disk. The motion of this crank-disk is to be so timed that in making half of a revolution the revolutions of the saw will be sufficient to saw off any size of wood or timber required to be sawed. For driving the crank-disk shaft with the proper speed, I mount a driving-shaft, G, on the saw-frame in suitable bearings, $b\,b$, the said shaft receiving its motion directly or indirectly from the driving-shaft of the machine. This shaft is provided with a worm, I, which gears into a worm-wheel, K, on a short cross-shaft, $g$, mounted on the saw-frame, and a beveled wheel on this shaft (shown in Fig. 2 as cast or formed with the worm-wheel) gears into a beveled pinion, J, on the crank-disk shaft $f$. The relative sizes of these beveled wheels, as well as the size of the worm-wheel, and the speed of the feed-driving shaft G are elements in determining the rate of feed by this device.

To carry out the full purpose of this feed mechanism, I transmit the revolving motion to the feed-driving shaft G from the saw-arbor D, so that the feed movement may be always determined and regulated by the movement of the saw. I therefore attach to one end, D', of the saw-arbor D a differential pulley, F, and on one end, G', of the feed-driving shaft G is secured a corresponding differential pulley, H. By applying the connecting-belt to different parts of the differential pulleys the rate of feed may be varied at will to suit the size and condition of the stuff to be sawed. Thus the general rate of speed communicated to the feed crank-disk is determined by the worm-wheel gear and the gear connecting the worm-wheel shaft and the crank-disk shaft. The rate of the vibrations is varied by the differential pulleys, and the actual movements of the feed-oscillating mechanism are controlled by the motion or speed of the saw-arbor. If the saw runs fast, the feed progresses correspondingly, and when the saw stops, the feed stops at the same moment, and begins again the moment the saw begins to revolve.

For producing the automatic and instantaneous swinging back of the saw-frame, after feeding it to the work by the above means, I employ the following mechanism: The crank-disk A' is mounted on its shaft, so as to turn loosely thereon, and it is coupled to the shaft by means of a ratchet-wheel, $h$, on the shaft, and a spring-pawl, $i$, on the inner face of the crank-disk, as shown in Fig. 3. In connection with this pawl-and-ratchet coupling, a counter-weight, K, is employed to swing the saw-frame back after each forward feed, being connected therewith by a cord, belt, or chain, $k$, passing over a pulley, as shown in Fig. 2. This mechanism, in combination with the crank-disk feed, operates as follows: As soon as the disk-crank A' in its slow revolutions has brought the crank-pin connecting with the pitman M to the dead-point of the disk, turned from the stationary end of the pitman, and begins to return, the weight K, pulling in that direction, instantly turns the crank-disk round nearly a half-circle, the pawl sliding over the teeth of the ratchet-wheel to permit it, and then the positive action of the revolving crank-disk shaft, acting through the ratchet-wheel on the pawl of the disk, begins immediately to feed forward again.

My improved self-feeding gage O, Fig. 1, is formed in the manner of a tilting lever, pivoted at $c$ to the frame of the machine, opposite to the rear side of the saw, as shown, there being a series of pivot-holes in the gage for adjusting the space between the face of the gage and the saw to the required length of stuff to be sawed off. From the outer end O', of the gage is suspended a counter-weight, $w$, which holds the gage in a horizontal position, as shown, but allows the other end of the gage to descend by a slight downward pressure, so that when a block or billet has been sawed off, the end bearing against the gage will carry the same down with it in falling, and thus by widening the space in the downward and backward swinging of the gage, the block is always set free, and all binding or clogging is avoided. As soon as the block is set free each time, the gage is immediately brought again into a horizontal position by the counter-weight, $w$. This self-feeding gage is especially valuable in connection with a saw mounted on a swinging frame for feeding to the work, since the obstruction to the free swinging of the saw caused by the wedging of the sawed-off blocks against it would render the machine inoperative automatically, or be liable to break the saw or its frame. The blocks or billets, as fast as they are sawed off, fall upon a platform, P, at each end of which are pulleys, around which a pair of belts is caused to slowly revolve by a belt, $l$, passing from the main shaft of the machine to the shaft of one of the pair of belt-carrying pulleys. This pair of belts has attached thereto, at short distances apart, a set of cross-slats, which, traveling with the belts, slide the blocks or billets off from the outer end of the platform as fast as the same fall thereon. The whole construction is clearly shown in the drawings.

I claim as my invention—

1. The combination of a feed-operating shaft, G G', mounted on the swinging saw-frame, worm I on the said shaft, worm-wheel K, geared into the worm, disk-crank A', having its shaft geared to the shaft of the worm-wheel, and pitman M M', pivoted at one end to the disk-crank, and at the other end to a stationary holder, for the purpose of imparting a vibratory feed movement to saw-frame, as set forth.

2. The combination of the saw-arbor D D' on a vibrating saw-frame, feed-operating shaft G G', mounted on the saw-frame, differential pulleys F H, respectively, on the saw-arbor and feed-shaft, and their connecting-belt, worm I on the said shaft, worm-wheel K, geared into the worm, disk-crank A', having its shaft geared to the shaft of the worm-wheel, and pitman M M', pivoted at one end to the disk-crank, and at the other end to a stationary holder, substantially as and for the purpose herein specified.

3. The combination of a swinging saw-frame, a disk-crank, A', adapted to turn on a revolving shaft on the saw-frame, and to be coupled to the shaft by a ratchet and pawl, a pitman, M M', pivoted at one end to the disk-crank, and at the other end to a stationary holder, and a counter-weight, R, connected by a cord or chain with the saw-frame, and adapted to swing the same backward, whereby the forward feed vibration of the saw-frame is made positive and gradual, and its return vibration is made free and instantaneous, substantially as herein specified.

4. In combination with a saw mounted on a suspended swinging saw-frame, as specified, a tilting gage, O, located opposite to the saw and the material being sawed, and a counter-weight, $w$, on the gage, substantially as and for the purpose herein specified.

JOEL H. JONES.

Witnesses:
F. L. OURAND,
C. H. OURAND.